US011946430B2

(12) United States Patent
Juchems et al.

(10) Patent No.: US 11,946,430 B2
(45) Date of Patent: Apr. 2, 2024

(54) OPTIMIZED ENERGY WAVEFORM FOR FUEL INJECTOR TRIMMING BASED ON VALVE ARRIVAL TIME

(71) Applicant: Caterpillar Inc., Peoria, IL (US)

(72) Inventors: Mitchell B Juchems, Tremont, IL (US); Daniel Reese Puckett, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/560,055

(22) Filed: Dec. 22, 2021

(65) Prior Publication Data

US 2023/0193844 A1 Jun. 22, 2023

(51) Int. Cl.
*F02D 41/20* (2006.01)
*F02D 41/40* (2006.01)

(52) U.S. Cl.
CPC ........... *F02D 41/20* (2013.01); *F02D 41/401* (2013.01); *F02D 2041/2013* (2013.01); *F02D 2041/2051* (2013.01); *F02D 2041/2055* (2013.01); *F02D 2041/2058* (2013.01)

(58) Field of Classification Search
CPC ................... F02D 41/20; F02D 41/401; F02D 2041/2051; F02D 2041/2055; F02D 2041/2058; F02D 2041/2003–2093; F02D 2041/2062
See application file for complete search history.

(56) References Cited

U.S. PATENT DOCUMENTS 7,013,876 B1 * 3/2006 Puckett ................... F02D 41/20 123/490
9,062,624 B2 * 6/2015 Archer ................ F02D 41/2467
9,593,657 B2 3/2017 Kusakabe et al.
10,072,596 B2 * 9/2018 Dames .................... F02D 41/40
10,087,870 B2 * 10/2018 Imai ........................ F02D 41/20
10,823,102 B2 * 11/2020 Itaba ...................... F02M 61/04
11,220,975 B1 * 1/2022 Pursifull ............... F02D 41/401
2013/0112172 A1 5/2013 Toyohara et al.
2021/0123393 A1 * 4/2021 Itaba ...................... F02M 51/06
2021/0249170 A1 * 8/2021 Katagiri .................. H01F 7/064

FOREIGN PATENT DOCUMENTS

JP 2010216278 A 9/2010
JP 2017180841 A * 10/2017 ............. F02D 41/20
JP 6561184 B2 8/2019

* cited by examiner

*Primary Examiner* — Hung Q Nguyen
*Assistant Examiner* — Mark L. Greene
(74) *Attorney, Agent, or Firm* — Brannon Sowers & Cracraft PC

(57) ABSTRACT

Controlling a fuel injector in a fuel system for an engine includes switching between a boosted voltage power supply and a lower voltage power supply during energizing a solenoid actuator in a fuel injector, and generating a solenoid energizing waveform including a pull-in tier produced by a boosted voltage incipient current, a boosted voltage second current, and a lower voltage later current, based on the switching between a boosted voltage power supply and a lower voltage power supply. Controlling a fuel injector further includes detecting an arrival timing of the valve based on a property of the lower voltage later current, and electronically trimming the fuel injector based on the detecting an arrival timing. Related control system logic is also disclosed.

19 Claims, 4 Drawing Sheets

OPTIMIZED ENERGY WAVEFORM FOR FUEL INJECTOR TRIMMING BASED ON VALVE ARRIVAL TIME

TECHNICAL FIELD

The present disclosure relates generally to controlling a fuel injector in a fuel system, and more particularly to electronically trimming a fuel injector based on a detected arrival timing of a valve.

BACKGROUND

Internal combustion engines employ a range of operating and logic strategies for controlling associated fuel systems. In a typical fuel system a plurality of fuel injectors are each associated with one of a plurality of combustion cylinders in an engine. The fuel injectors are electronically controlled and receive electrical control currents from an engine control system. The control currents cause energizing of solenoids or other electrical actuators in or associated with the fuel injectors to adjust valves therein that determine the timing and manner of injection of fuel.

One fuel system configuration widely applied in the field of compression-ignition diesel engines utilizes a direct operated nozzle check that is opened and closed to start and end fuel injection based on a hydraulic pressure applied to a surface of the nozzle check. A spill valve in the fuel injector controls fluid connection between a plunger cavity and a low-pressure space or outlet. When the spill valve is open a plunger in the fuel injector reciprocates passively to exchange fuel between a plunger cavity and the low pressure space. When the spill valve is closed the plunger can pressurize fuel in the fuel injector, with fuel injection started and ended based on controlling the direct operated nozzle check.

Engineers have experimented for decades with energization of electrical actuators for such valves in fuel injectors. Controlling energization of the solenoids in various ways can result in various desired properties of fuel injection, including fuel injection timing, fuel injection pressure, and fuel injection rate shape in some instances. Energizing solenoids in fuel injectors of course requires electrical energy. In some systems the electrical energy is supplied by a battery. In other systems the electrical energy is supplied by a higher voltage power supply resident on or associated with an electronic control module of the fuel control system. Recent research has focused on ways to avoid unneeded energy consumption in fuel systems. Engineers are also continually searching for improved and alternative ways to monitor and control specific aspects of fuel injector operation to various ends including emissions mitigation and overall system efficiency. United States Patent Application Publication No. US20210140386A1 illustrates a typical spill valve fuel injector arrangement.

SUMMARY

In one aspect, a method of controlling a fuel injector in a fuel system for an engine includes switching between a boosted voltage power supply and a lower voltage power supply during energizing a solenoid actuator to move a valve in a fuel injector from a first position to a second position. The method further includes generating a solenoid energizing waveform including a pull-in tier produced by a boosted voltage incipient current, a boosted voltage second current, and a lower voltage later current, based on the switching between a boosted voltage power supply and a lower voltage power supply. The method further includes detecting an arrival timing of the valve at the second position based on a property of the lower voltage later current, and trimming the fuel injector based on the detecting an arrival timing of the valve at the second position.

In another aspect, a fuel system for an engine includes a fuel injector having a solenoid actuator and a valve operably coupled to the solenoid actuator and movable between a first position and a second position, a boosted voltage power supply, and a lower voltage power supply. The fuel system further includes a fueling control unit structured to energize the solenoid actuator using the boosted voltage power supply and the lower voltage power supply to adjust the valve from the first position to the second position, and to switch between the boosted voltage power supply and the lower voltage power supply to generate a solenoid energizing waveform including a pull-in tier produced by a boosted voltage incipient current, a boosted voltage second current, and a lower voltage later current. The fueling control unit is further structured to detect an arrival timing of the valve at the second position, and to trim the fuel injector based on the detected arrival timing of the valve.

In still another aspect, a fuel control system for a fuel system in an engine includes a fueling control unit having a solenoid energizing waveform controller. The solenoid energizing waveform controller is structured to energize a solenoid actuator for a valve in a fuel injector using a boosted voltage power supply and a lower voltage power supply to adjust the valve from a first position to a second position. The solenoid energizing waveform controller is further structured to switch between the boosted voltage power supply and the lower voltage power supply to generate a solenoid energizing waveform including a pull-in tier produced by a boosted voltage incipient current and a boosted voltage second current, in a first engine cycle. The solenoid energizing waveform controller is further structured to detect an arrival timing of the valve at the second position, and to trim the fuel injector via varying at least one of a current duration or a start of current timing of a boosted voltage incipient current, in a subsequent engine cycle, based on the detected arrival timing of the valve at the second position.

DETAILED DESCRIPTION

Figure 1:
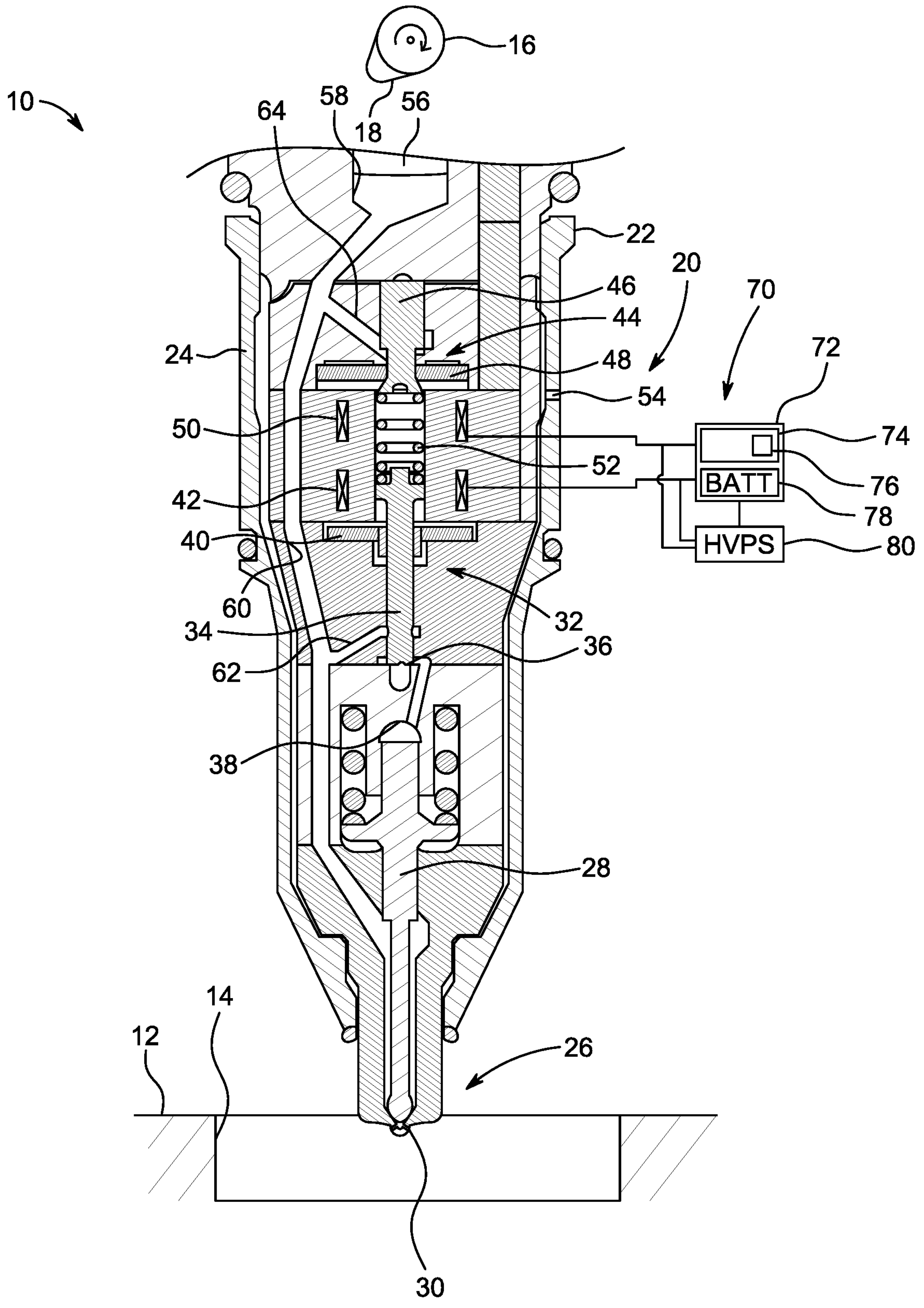
FIG. 1 is a sectioned diagrammatic view of an internal combustion engine system, according to one embodiment.

Referring to FIG. 1, there is shown an internal combustion engine system 10, according to one embodiment. Engine system 10 includes an internal combustion engine 12 having a combustion cylinder 14 formed therein. Combustion cylinder 14 may be one of any number of combustion cylinders in engine 12 in any suitable arrangement such as an in-line pattern, a V-pattern, or still another. Engine 12 will typically be equipped with an intake system, an exhaust system, engine valves, and various other apparatus not explicitly shown. A piston will be movable in combustion cylinder 14 between a top dead center position and a bottom dead center position, typically in a conventional four-cycle pattern. Engine 12 may be compression-ignited and operated on a suitable compression-ignition fuel such as a diesel distillate fuel although the present disclosure is not limited as such. Engine 12 may also include a rotatable crankshaft (not shown) coupled by way of a geartrain with a rotatable camshaft 16 having a cam lobe 18. Camshaft 16 will typically include a plurality of cam lobes arranged to operate equipment including fuel injectors in engine system 10, as further discussed herein.

Engine system 10 further includes a fuel system 20. Fuel system 20 will typically include a plurality of fuel injectors each positioned to extend partially into one of a plurality of combustion cylinders in engine 12. In FIG. 1 one fuel injector 22 is shown associated with combustion cylinder 14, and it will be appreciated that description and discussion of fuel injector 22 should be understood by way of analogy to refer to any other fuel injectors of fuel system 20. Fuel injector 22 includes an injector housing 24 having a nozzle 26 that extends into combustion cylinder 14. A plurality of nozzle outlets 30 are formed in nozzle 26 and fluidly communicate with combustion cylinder 14. Fuel injector 22 also includes a direct operated check or DOC 28 movable in injector housing 24 to open and close nozzle outlets 30 to directly inject a liquid fuel, such as diesel distillate fuel, into combustion cylinder 14. DOC 28 is directly hydraulically operated on the basis of a fluid pressure, typically a fluid pressure of fuel, in a pressure control chamber 38.

Fuel injector 22 also includes an injection control valve assembly 32. Injection control valve assembly 32 is operable to control a closing hydraulic pressure in pressure control chamber 38 to enable opening and closing of DOC 28. Injection control valve assembly 32 includes an injection control valve 34 movable to open and close a valve seat 36. When valve seat 36 is opened pressure control chamber 38 can fluidly connect to a low pressure space 54 defined by injector housing 24 enabling DOC 28 to open and permit spraying of fuel from nozzle outlets 30. When valve seat 36 is closed an increased hydraulic pressure is seen in pressure control chamber 38 and causes DOC 28 to close. An armature 40 is coupled with injection control valve 34. Armature 40 is associated with a solenoid actuator 42 that can be energized to magnetically attract armature 40 and open valve seat 36. When solenoid actuator 42 is deenergized a biasing spring 52 urges injection control valve 34 closed against valve seat 36.

Fuel injector 22 also includes a spill valve assembly 44. Spill valve assembly 44 includes a spill valve 46 coupled with an armature 48 and a solenoid actuator 50. When solenoid actuator 50 is energized armature 48 is magnetically attracted toward solenoid actuator 50. When solenoid actuator 50 is deenergized biasing spring 52 urges armature 48 and spill valve 46 away from solenoid actuator 50. Fuel injector 22 also includes a plunger 56 movable in a plunger cavity 58. In an implementation plunger 56 is mechanically cam-actuated by way of rotation of camshaft 16, in a generally known manner. When spill valve 46 is open, upward movement of plunger 56 causes fuel to be drawn into plunger cavity 58 such as by way of a spill passage 64 from low pressure space 54. Downward movement of plunger 56 causes the fuel to be discharged from plunger cavity 58 through spill passage 64 and back to low pressure space 54. When spill valve 46 is closed fluid communication between plunger cavity 58 and low pressure space 54 is blocked and advancement of plunger 56 causes fuel pressure in plunger cavity 58 to increase. The increased fuel pressure is communicated by way of a nozzle supply passage 60 to the vicinity of nozzle outlets 30. When DOC 28 is lifted, at a desired timing, fuel sprays from nozzle supply passage 60 out of nozzle outlets 30. Another fluid passage 62 fluidly connects between nozzle supply passage 60 and injection control valve 34. In the illustrated embodiment spill valve assembly 44 is resident in fuel injector 22. In other embodiments a spill valve assembly could be positioned externally to fuel injector 22. Also in the illustrated embodiment the hydraulic control fluid used for direct control of DOC 28 is fuel. In other instances a different fluid, such as engine oil, could be used for direct control of a nozzle outlet check. Plunger 56 may be equipped with a tappet contacted by cam lobe 18. In other instances, a rocker arm actuation assembly could be interposed plunger 56 and camshaft 16.

Fuel system 20 also includes a fuel control system 70. Fuel control system 70 includes an electronic control module or ECM 72 having thereon an electronic control unit or ECU 74. ECU 74 can be, or can include, a programmable logic controller such as a microprocessor or microcontroller and suitable computer readable memory storing program control instructions which, when executed, cause fuel injector 22 to operate according to the present disclosure. Any suitable computer readable memory such as RAM, ROM, EPROM, DRAM, SDRAM, FLASH, or still another could be used. Fuel control system 70 also includes a lower voltage power supply such as a battery 78, and a boosted, higher voltage power supply 80. Battery 78 is shown as part of ECM 72 but could be a separate apparatus in other embodiments. Higher voltage power supply or HVPS 80 is shown physically separated from ECM 72 but could also be a part of ECM 72 in some embodiments. As will be further apparent from the following description, fuel control system 70 is uniquely configured to operate fuel injector 22, and other such fuel injectors as might be included in fuel system 20, in a multi-shot fuel injection mode under different or broader engine operating conditions than is the case with certain other known control system arrangements. Moreover, as also further discussed herein, fuel control system 70 is capable of operating fuel injector 22, and other such fuel injectors as might be included in fuel system 20, using a relatively reduced energy optimized waveform and, based on detecting valve arrival timing, trim fuel injectors in fuel system 20.

Those skilled in the art will be familiar with the concept of electronic trimming. In the fuel systems field electronic trimming can be used to vary the timing, duration, magnitude, and potentially other properties of electrical control currents sent to electrical actuators in a fuel injector to improve or optimize fuel injector performance. The present disclosure provides a unique electronic trimming strategy implemented in methodology and control logic that can exploit and improve precision and accuracy in determining a valve arrival timing, such as an arrival time of spill valve 46 at a closed position using an optimized solenoid energizing waveform. It will be recalled fuel injector 22 includes a solenoid actuator 50 for spill valve 46. It will also be recalled fuel system 20 includes boosted voltage or HVPS power supply 80 and lower voltage power supply or battery 78. Fueling control unit 74 and energizing waveform controller 76, the capabilities and functionalities of which are referred to at times interchangeably herein, may be structured to energize solenoid actuator 50 using HVPS 80 and battery 78 to adjust spill valve 46 from a first position, such as an open position, to a second position, such as a closed position. Fueling control unit 74 may be further structured to switch between HVPS 80 and battery 78 during energizing solenoid actuator 50 to generate a solenoid energizing waveform including a pull-in tier produced by a boosted voltage incipient current, a lower voltage earlier current, a boosted voltage second current, and a lower voltage later current. The boosted voltage incipient current may be a starting current that initiates motion of spill valve 46. The lower voltage earlier current follows the boosted voltage incipient current and precedes the boosted voltage second current. In some embodiments, the boosted voltage second current may have a duration less than a duration of the boosted voltage incipient current and less than a duration of the lower voltage earlier current. The solenoid energizing waveform is discussed in further detail herein, but can thus be understood to include an incipient or first electrical current produced by HVPS 80, a second current produced by battery 78, a third current produced by HVPS 80, and a fourth current produced by battery 78. These four currents make up the pull-in tier whereby spill valve 46 is moved from its first, open position to its second, closed position. Following the pull-in tier the solenoid energizing waveform can include a keep-in tier applied as spill valve 46 reaches and settles at its second, closed position, and a hold-in tier applied to maintain spill valve 46 at its second, closed position. Electrical control currents applied in the keep-in tier and the hold-in tier can be produced using battery 78. Relatively late in the pull-in tier fueling control unit 74 can detect an arrival timing of spill valve 46 at the second, closed position. In a manner and for purposes further discussed herein, fueling control unit 74 may also be structured to trim fuel injector 22 based on the detected arrival timing of spill valve 46 at the second, closed position.

Figure 2:
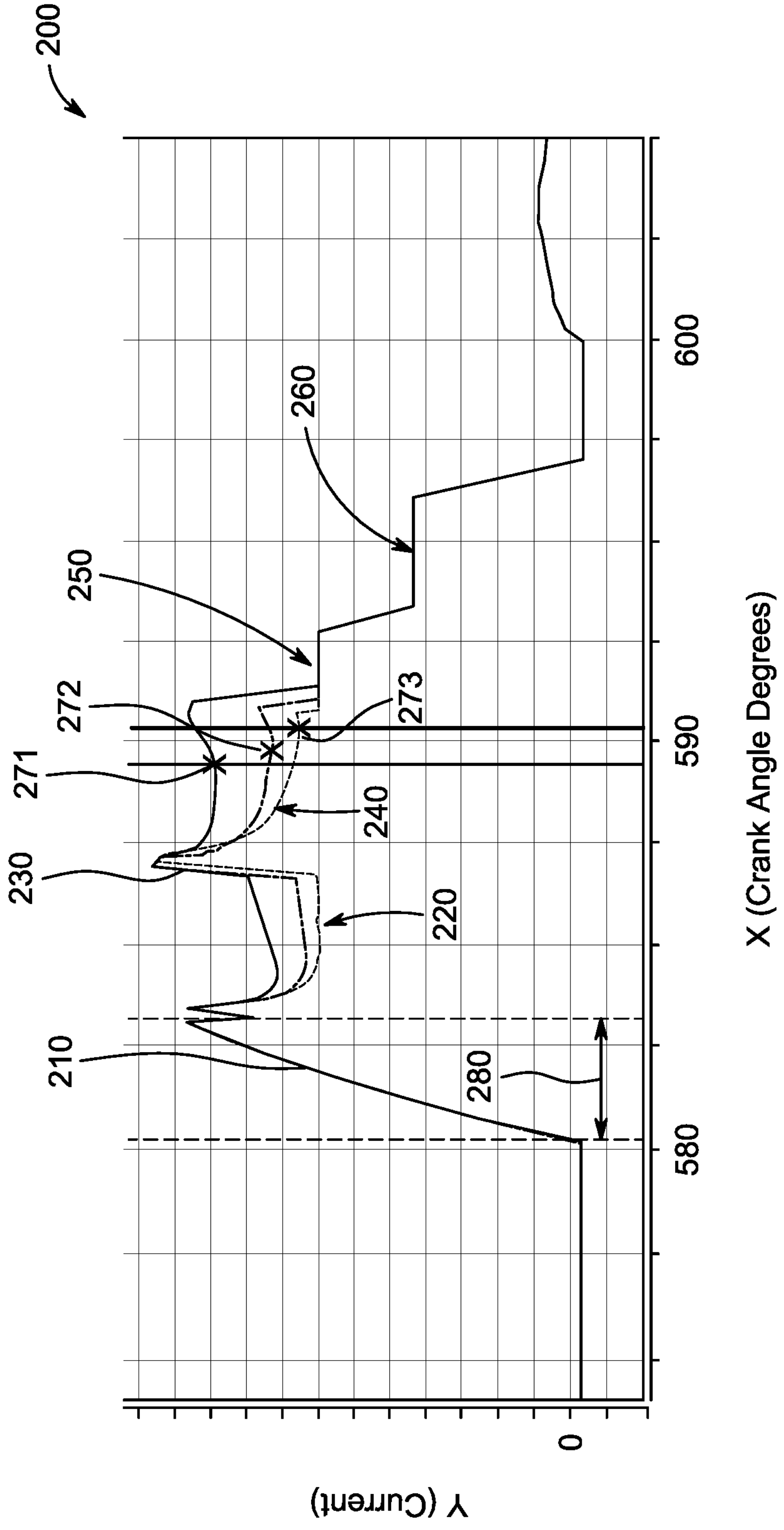
FIG. 2 is a control loop diagram, according to one embodiment.

Referring also now to FIG. 2, there is shown a graph 200 with electrical current on the Y-axis and crank angle degrees on the X-axis, and illustrating an example solenoid energizing waveform according to the present disclosure. In graph 200 a boosted voltage incipient current is shown at 210, as might be applied to solenoid actuator 50 to initiate motion of the subject valve, spill valve 46 in the described embodiment. Following the boosted voltage incipient current 210 graph 200 shows a lower voltage earlier current at 220. A boosted voltage second current is shown at 230, and a lower voltage later current is shown at 240. Currents 210, 220, 230, and 240 make up the pull-in tier. Following the pull-in tier a keep-in current 250 is applied, then subsequently a hold-in current 260. Following hold-in current 260 solenoid actuator 50 is deenergized, enabling biasing spring 52 to return spill valve 46 to its first, open position. It can be noted from FIG. 2 that three separate current traces are shown in the pull-in tier. These three separate current traces represent three different lower voltage currents generated using three different battery voltages for experimental and/or simulation purposes. The uppermost of the three currents shown in the pull-in tier in FIG. 2 might be observed using a 35-volt lower voltage battery power supply. The lowermost of the three currents might be observed using a 25-volt lower voltage battery power supply. The middle of the three currents might be observed using a 28-volt lower voltage battery power supply. In an actual implementation one of these battery supply voltages, or still another battery supply voltage, might be used.

It will be recalled arrival timing of spill valve 46 at the second, closed position is detected by fueling control unit 74. In an implementation, fueling control unit 74 is further structured to detect the arrival timing of spill valve 46 at the second, closed position based on a property of the lower voltage later current 260. It can be further noted from FIG. 2 that boosted voltage second current 230 is applied for a relatively short duration producing a rapid pulse of boosted voltage energizing solenoid actuator 50, with the waveform decreasing in amplitude thereafter as the lower voltage later current 240 is applied. Reference numerals 271, 272, and 273 identify local minimum points observed in lower voltage later current 240, thus reflecting a property thereof. These local minimum points occur just prior to lower voltage later current 240 beginning to increase in amplitude and correspond to observed valve arrival timings of spill valve 46 at the second, closed position. The increase in amplitude of lower voltage later current 240 can be the result of a back EMF produced in solenoid actuator control circuitry as spill valve 46 settles at its second, closed position.

It will also be recalled fueling control unit 74 is structured to electronically trim fuel injector 22 based on the detected arrival timing of spill valve 46 at the second position. In FIG. 2 a valve trim range is shown at 280. In an embodiment, the detected valve arrival timing may include a valve arrival timing in a first engine cycle. Fueling control unit 74 may be further structured to trim fuel injector 22 via varying at least one of a current duration or a start of current timing of a boosted voltage incipient current in a second, subsequent engine cycle. It will thus be understood that current duration or start of current timing can be varied going forward from a given engine cycle based on a detected valve arrival timing. In an embodiment, fueling control unit 74 can vary both current duration and start of current timing closed loop, with current duration prioritized and varied in a first loop calculation and start of current timing deprioritized and varied in a second loop calculation, as further discussed herein. In any event, varying current duration can include varying a target current magnitude of the boosted voltage incipient current in the second, subsequent engine cycle. Put differently, current duration can be varied by adjusting a current amplitude that is targeted to be attained via fueling control unit 74. It will be understood from FIG. 2 that boosted voltage incipient current 210 will increase up to some target current amplitude, and that by increasing or decreasing this target current amplitude a current duration of boosted voltage incipient current 210 will be adjusted.

Figure 3:
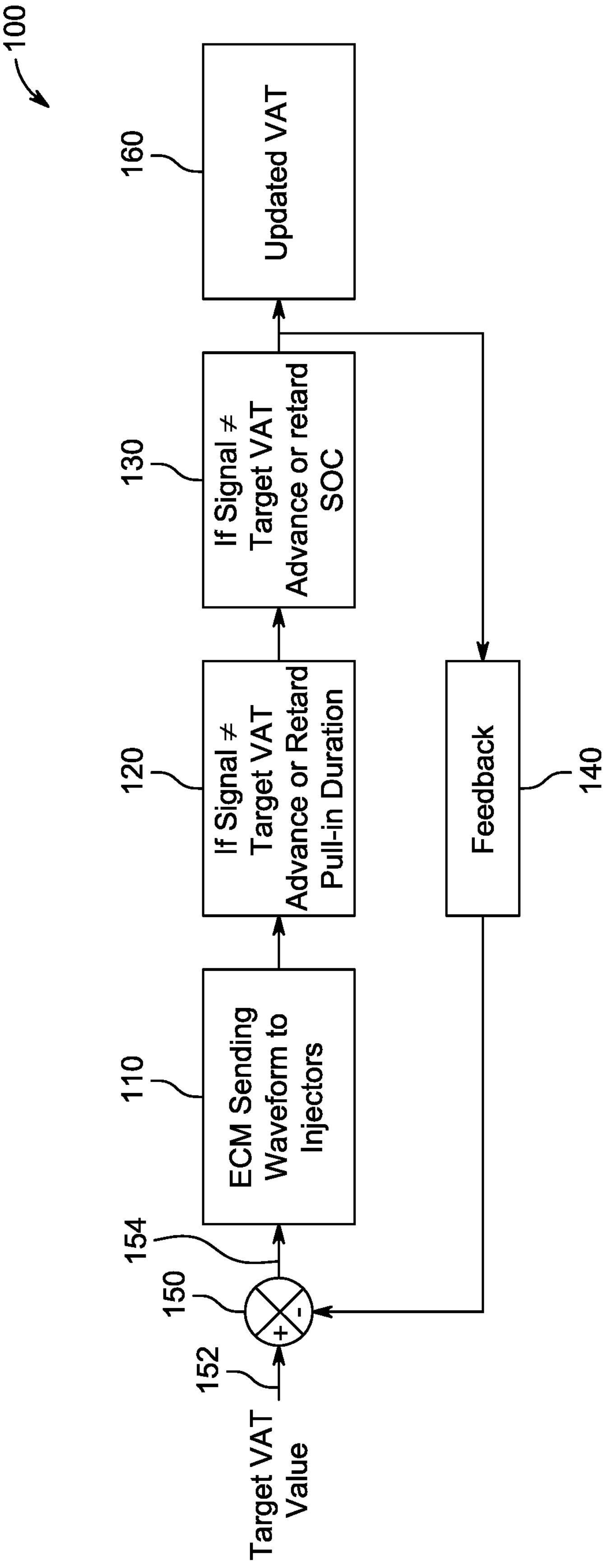
FIG. 3 is a graph of solenoid energization in a fuel injector, according to one embodiment.

As noted, varying current duration can be prioritized and varying start of current timing can be deprioritized. This can be understood to mean that fueling control unit 74 will first attempt to trim fuel injector 22 by varying current duration and, if not successful, trim fuel injector 22 by varying start of current timing. Varying start of current timing can be understood in view of FIG. 2 to be advancing or retarding the crank angle timing at which boosted voltage incipient current 210 commences. Referring also now to FIG. 3, there is shown a control loop diagram 100 illustrating additional logic features and functions of fueling control unit 74 and energizing waveform controller 76. In diagram 100 at a block 110 ECM 72, including fueling control unit 74 and energizing waveform controller 76, energizes solenoid actuator 50 sending a desired waveform to one or more fuel injectors in fuel system 20. At a block 120 pull-in duration, meaning current duration of current 210 as in FIG. 2, is advanced or retarded if a VAT (valve arrival timing) signal does not equal a target VAT occurring. At a block 130 start of current or SOC is advanced or retarded if the signal does not equal a target VAT. At a block 140 feedback as to actual or observed valve arrival timing is fed to a summer 150. Summer 150 receives a target VAT value and calculates a valve arrival time error 154 which is fed to block 110. Thus, summer 150 can be understood as calculating a valve arrival time error based on a detected valve arrival timing, which valve arrival time error is used in block 110 to determine a solenoid energizing waveform to be used. An updated VAT is outputted at a block 160.

It will be recalled current duration may be prioritized and start of current timing deprioritized. With continued focus on FIG. 3, it can be understood that block 120 can be executed by fueling control unit 74 in an effort to achieve a target VAT. If the target VAT is not observed in a first loop calculation then advancing or retarding start of current as in block 130 can be performed in a second or subsequent loop calculation. In alternative embodiments trimming a fuel injector according to the present disclosure could include executing only the logic as in block 120, executing only the logic as in block 130, switching the prioritization of current duration versus start of current timing, or still other extensions or modifications.

INDUSTRIAL APPLICABILITY

Figure 4:
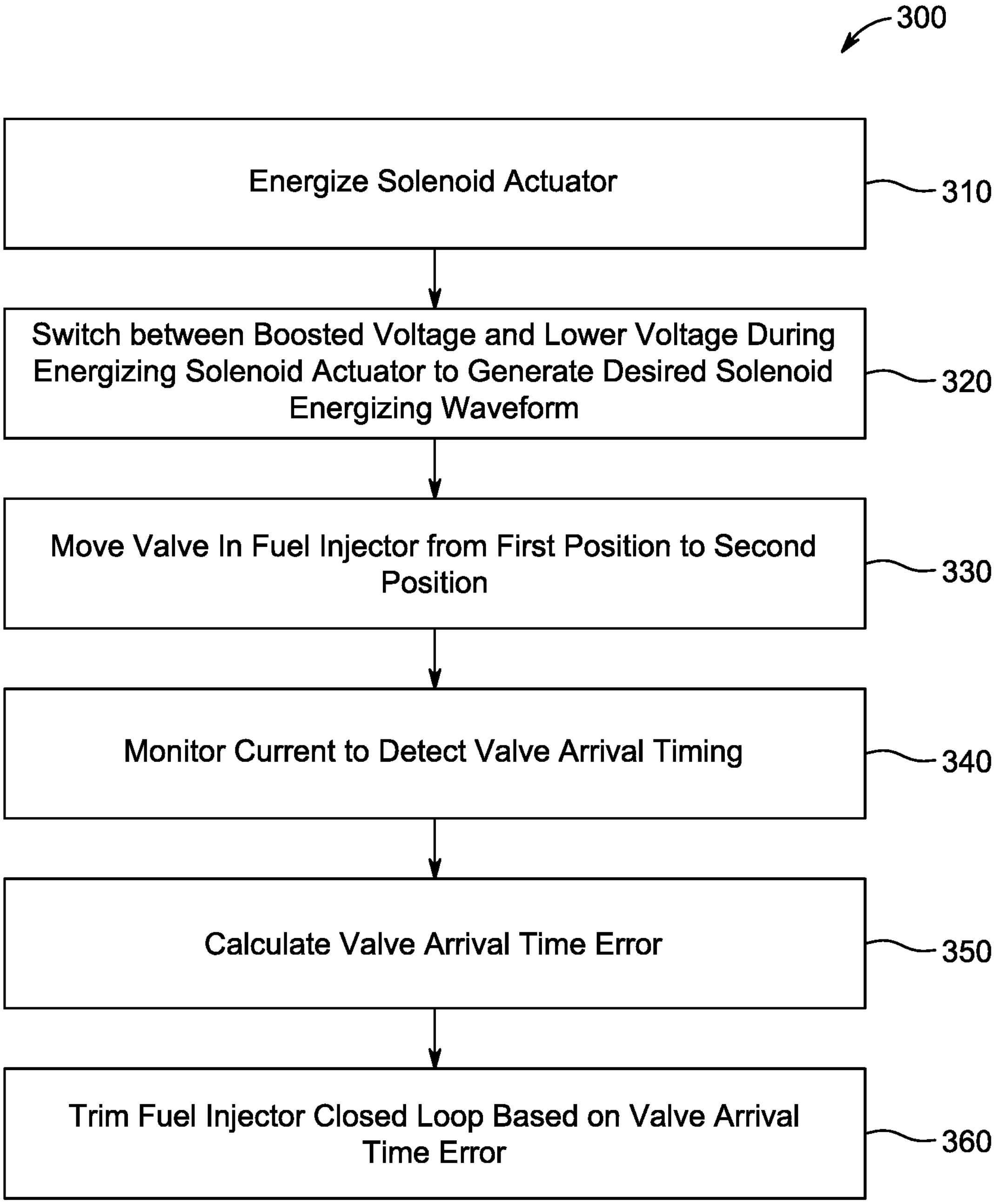
FIG. 4 is a flowchart illustrating example methodology and logic flow, according to one embodiment.

Referring to the drawings generally, but also now focusing on FIG. 4, there is shown a flowchart 300 illustrating methodology and logic flow in controlling a fuel injector in a fuel system for an engine according to the present disclosure. At a block 310 a solenoid actuator is energized including, for example, energizing solenoid actuator 50 to initiate moving spill valve 46 in fuel injector 22 from a first position to a second position. From block 310 flowchart 300 advances to a block 320 to switch between a boosted voltage power supply and a lower voltage power supply during energizing a solenoid actuator to generate a desired solenoid energizing waveform. It will be appreciated that blocks 310 and 320 can be executed at the same time. Responsive to energizing the solenoid actuator and switching between power supplies as in blocks 310 and 320, at a block 330 a valve in a fuel injector including, for example, spill valve 46, is moved from a first position to a second position. Moving the valve from a first position to a second position can include closing a spill valve as described herein. After moving the valve to the second position, the subject solenoid actuator is deenergized and the valve returns to its first position. As discussed herein in the case of spill valve 46, returning spill valve 46 to its first position can reestablish fluid communication between plunger cavity 58 and low pressure space 54, ending pressurization of fuel in fuel injector 22.

From block 330 flowchart 300 advances to a block 340 to monitor current to detect valve arrival timing as discussed herein. It will be understood that blocks 310, 320, 330, and 340 can occur in a first engine cycle. It will also be appreciated that moving the subject valve from its first position to its second position could occur multiple times in a given engine cycle thus producing multiple fuel pressurization events. It can be desirable in certain instances to employ multiple fuel injections in a given engine cycle. One such instance includes when operating an engine at a relatively high engine speed. At relatively high engine speeds it can be necessary to inject a relatively large quantity of fuel. Injecting all of the fuel in a single-shot injection can be associated with increased noise, increased harshness, vibrations, and can be associated with other undesirable operating parameters. According to the present disclosure an optimized energy waveform, where a lower voltage current can be used after a boosted voltage incipient or starting current, energy savings can be realized. Such energy savings can make multiple shots practicable in instances where they might otherwise not be practicable, as an energy or power output capacity of an ECM is not exceeded.

At a block 350 valve arrival time error is calculated. From block 350 flowchart 300 advances to a block 360 to trim the fuel injector via closed loop control based on the valve arrival time error. As discussed herein trimming the fuel injector can include trimming the fuel injector according to multiple, successive loop calculations prioritizing varying of current duration and deprioritizing varying of start of current timing. In some instances, trimming the fuel injector could be successful by way of adjusting only the current duration. In other instances trimming the fuel injector to obtain a desired valve arrival timing or minimize a valve arrival time error could require multiple loop calculations in a plurality of subsequent engine cycles.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of controlling a fuel injector in a fuel system for an engine comprising:

switching between a boosted voltage power supply and a lower voltage power supply during energizing a solenoid actuator to move a valve in a fuel injector from a first position to a second position, and wherein the first position includes an open position and the second position includes a closed position;

generating a solenoid energizing waveform including a pull-in tier produced by a boosted voltage incipient current, a boosted voltage second current, and a lower voltage later current following the boosted voltage second current, based on the switching between the boosted voltage power supply and the lower voltage power supply;

detecting an arrival timing of the valve at the second position based on a property of the lower voltage later current; and trimming the fuel injector via varying the boosted voltage incipient current, based on the detecting the arrival timing of the valve at the second position.

2. The method of claim 1 wherein the pull-in tier is produced by a lower voltage earlier current following the boosted voltage incipient current and preceding the boosted voltage second current.

3. The method of claim 2 wherein the solenoid energizing waveform further includes a keep-in tier, and a hold-in tier produced by a lower voltage third current.

4. The method of claim 2 wherein the boosted voltage second current has a duration less than a duration of the boosted voltage incipient current and less than a duration of the lower voltage earlier current.

5. The method of claim 2 wherein the detecting the arrival timing of the valve includes detecting a valve arrival timing in a first engine cycle, and the trimming the fuel injector includes varying at least one of a current duration or a start of current timing of the boosted voltage incipient current in a subsequent engine cycle.

6. The method of claim 5 further comprising calculating a valve arrival time error based on the detecting the valve arrival timing, and the trimming the fuel injector is based on the calculating the valve arrival time error.

7. The method of claim 6 wherein the trimming the fuel injector includes varying the current duration via varying a target current magnitude of the boosted voltage incipient current in the subsequent engine cycle.

8. The method of claim 6 wherein the trimming the fuel injector includes varying the current duration based on the valve arrival time error in a first loop calculation, and varying the start of current timing based on the valve arrival time error in a subsequent loop calculation.

9. The method of claim 1 wherein the detecting the arrival timing of the valve includes detecting the arrival timing of the valve based on a local minimum of the lower voltage later current.

10. The method of claim 1 wherein the solenoid actuator includes a solenoid actuator of a spill valve of the fuel injector.

11. A fuel system for an engine comprising:

a fuel injector including a solenoid actuator and a valve operably coupled to the solenoid actuator and movable between a first position and a second position;

a boosted voltage power supply;

a lower voltage power supply;

a fueling control unit structured to:

energize the solenoid actuator using the boosted voltage power supply and the lower voltage power supply to adjust the valve from the first position to the second position;

switch between the boosted voltage power supply and the lower voltage power supply to generate a solenoid energizing waveform including a pull-in tier produced by a boosted voltage incipient current, a boosted voltage second current, and a lower voltage later current;

detect an arrival timing of the valve at the second position;

calculate a valve arrival time error; and trim the fuel injector via closed loop varying of a current duration and a start of current timing of the boosted voltage incipient current based on the valve arrival time error.

12. The fuel system of claim 11 wherein the valve includes a spill valve.

13. The fuel system of claim 11 wherein the fueling control unit is further structured to detect the arrival timing of the valve based on a property of the lower voltage later current.

14. The fuel system of claim 13 wherein the property of the lower voltage later current includes a local minimum.

15. The fuel system of claim 11 wherein:

the solenoid energizing waveform includes a lower voltage earlier current following the boosted voltage incipient current and preceding the boosted voltage second current; and the boosted voltage second current has a duration less than a duration of the boosted voltage incipient current and less than a duration of the lower voltage earlier current.

16. The fuel system of claim 11 wherein:

the detected valve arrival timing includes a valve arrival timing in a first engine cycle; and the fueling control unit is further structured to trim the fuel injector via the varying of the current duration and the start of current timing of the boosted voltage incipient current in a subsequent engine cycle.

17. A fuel control system for a fuel system in an engine comprising:

a fueling control unit including a solenoid energizing waveform controller structured to:

energize a solenoid actuator for a valve in a fuel injector using a boosted voltage power supply and a lower voltage power supply to adjust the valve from a first position to a second position;

switch between the boosted voltage power supply and the lower voltage power supply to generate a solenoid energizing waveform including a pull-in tier produced by a boosted voltage incipient current, a boosted voltage second current, and a lower voltage later current following the boosted voltage second current, in a first engine cycle;

detect an arrival timing of the valve at the second position based on the lower voltage later current;

calculate a valve arrival time error; and trim the fuel injector via closed loop varying of a current duration Of and a start of current timing of the boosted voltage incipient current, in a subsequent engine cycle, based on the valve arrival time error.

18. The fuel control system of claim 17 wherein the pull-in tier further includes a lower voltage earlier current following the boosted voltage incipient current and preceding the boosted voltage second current.

19. The fuel control system of claim 18 wherein the solenoid energizing waveform controller is further structured to:

detect the arrival timing of the valve at the second position based on a local minimum of the lower voltage later current;

and trim the fuel injector via closed loop prioritized and deprioritized varying, respectively, of the current duration and the start of current timing, of boosted voltage incipient currents, in a plurality of subsequent engine cycles.

* * * * *